June 1, 1965 P. H. TAYLOR 3,186,702
LIQUID SPRING
Filed Feb. 23, 1962 5 Sheets-Sheet 1

INVENTOR.
Paul H. Taylor

INVENTOR.
Paul H. Taylor

June 1, 1965  P. H. TAYLOR  3,186,702
LIQUID SPRING
Filed Feb. 23, 1962  5 Sheets-Sheet 4

INVENTOR.
Paul H. Taylor

United States Patent Office 3,186,702
Patented June 1, 1965

3,186,702
LIQUID SPRING
Paul Hollis Taylor, Grand Island, N.Y., assignor to Tayco Developments, Inc., North Tonawanda, N.Y., a corporation of New York
Filed Feb. 23, 1962, Ser. No. 175,113
17 Claims. (Cl. 267—1)

This invention is related generally to compressible liquid devices for modifying, storing, metering and monitoring energy which use the limited compression of materials at high pressure as their energy source and more particularly to such devices having inherent wear compensating means.

In the mechanical arts where hydraulic or pneumatics are used, the retention of the liquid, gas, or air under pressure with leakage, is tolerated though deplored. On such hydraulic devices, in which the hydraulic liquid is replenished by an external power source, leakage while annoying is not a critical requirement as it is in liquid springs. In liquid springs, and related energy devices, it is absolutely essential that the liquid be maintained under high pressures at zero leakage for long periods of time. The markets, useage, and reliability of self-contained energy devices such as liquid springs, is dictated entirely by the degree to which they retain liquids. The very fact that seals in liquid springs must run essentially dry provides high friction so that they are more subject to wear, abrasion, fatigue, and loss of interference at high pressures at which they operate. Pressures as high as 100,000 p.s.i. in liquid springs, which tend to reduce seal volumes and interference, further aggravate leakage as compared with other hydraulic devices. In liquid springs, micro leakage losses render the device inoperative, sometimes as little as .01 cc. being critical.

The state of the art now provides liquid springs capable of long energy storage without leakage; in fact, they surpass mechanical springs in such use as missile supports or other applications of infrequent use. Under high cyclic frequency, it is quite another matter, liquid springs are not good enough for long cycle use such as in dies, machine tools, etc. This is primarily due to seal wear, under the high pressures of liquid springs. This occurs despite super-finishes of under ½ millionth roughness, finished longitudinally in the direction of seal travel to minimize such wear.

Liquid springs also leak under high velocity and piston reversals because the elastic memory of the seal material in its elastic deformation is too slow.

The liquid spring high pressure function generally provides a requirement for sealing members to be protected by plastic or metallic anti-extrusion members, such as nylon, Teflon, silver, against the abrasion, wear, and pinching normally associated with the changing clearance between the mating parts as the tendency to extrude past the gap between the piston and cylinder is very great at the high pressures of liquid springs, particularly due to changing clearances from deflecting walls as pressure increases.

Analysis of requirements establish that:

(1) In compressible liquid devices, leakage cannot be tolerated.

(2) Sliding or reciprocating parts, seals, and compressible liquid materials must be compatible to withstand high bearing and friction requirements, at zero leakage of the seal.

(3) The seal-liquid combination preferably must wet or moisten the seal to reduce friction and wear but not leak as a result of said wetting.

(4) The comparatively soft elastomeric seals used in compressible liquid devices must be protected against extrusion by use of the anti-extrusion members so that such seals can operate at pressures ranging between zero gage and upwards to 50,000 p.s.i., and sometimes as high as 100,000 p.s.i. and seal at all pressures.

(5) Such seals must be able to follow a high rate of deflection in the mating reciprocating parts due to the high internal pressures while following an expanding bore as pressure is at extreme variations with stroke, without leakage.

(6) Reciprocating parts, seals, liquid combinations should present a low friction surface to the side wall of the device without leakage, to induce said low friction.

(7) Reciprocating parts, seals, liquid combination should prevent the leakage of the compressible liquid by the seal but still provide a lubricated or bearing surface.

(8) If said seals are lubricated with a liquid, such material should tend to reduce the tenacity of the compressible liquids, for the side wall of the device.

(9) the anti-extrusion members should shear off of the compressible liquid from the wall ahead of seal movement.

(10) Preferably, the seal in combination with the liquid should generate within itself pressures greater than the liquid while maintaining this pressure on a yielding, deflecting wall of a liquid spring being subject to extremes of pressure and deflection each cycle.

(11) Such seals should not have the delayed or slow memory inherent in the normal sealing through the elastic deformation of elastomers such as buna, neoprene, silicone, urethane, Viton, etc.

(12) Means for compensating seal wear should be available inside the spring.

The requirements listed above, it has been felt by this inventor, could more readily be accomplished by use of a seal which itself was in its compressibility range so that its response to changing deflections and pressures would be rapid. This rathen than using a seal in its elastic range with its concomitant poor memory, as seals are customarily used. With the changing clearances of the yielding wall in the high liquid compression of compressible liquid devices, the wall is not followed quick enough by the normal elastomeric seal, and leakage occurs. Due to the high pressure exerted upon elastomeric seals, in liquid springs, consideration must be given to the substantial compressibility of the elastomers. They are generally reduced in volume by 2% at 3,000 p.s.i., 6% at 20,000 p.s.i., further complicating sealing by said elastomeric element by interference and deflection, as the reduction in volume at 6% is generally about the amount of squeeze used in the usual recommended interference associated with such seals in hydraulic devices. Thus, it has long been the inventor's opinion, that preferably, a seal should be maintained in its compressibility range and it should be pre-compressed greater than 6% by volume so that at upwards of 20,000 p.s.i., seal pre-compression within the groove and against the wall of the device was always greater than the liquid pressure which was tending to reduce it in volume.

In this invention, sealing is actually accomplished by the compression of the seal material to its high compressibility range in a confined space, so that it exerts always a greater load in p.s.i. against seal groove and the wall of the device than the liquid pressure which it contains.

This contrasts with normal seals which work because their initial interference puts an initial pressure higher on the seal than the liquid which must pass it and as the pressure increases, it is always intensified higher, provided the parts do not yield. Original intensification of the pressure is always slightly higher than the liquid which must leak, due to small intensified seal surface engagement which provides intensification. However, as the walls of a compressible device yield, this intensification often is lost, particularly at high reciprocation because of the slow elastic memory of said seals. This is generally compounded by unconfined compressibility pressures, which reduces seal volume, so that leakage then results.

As a typical example of this latter statement, in my tubular piston concept U.S. Patent No. 2,909,368, leakage always starts first at the stud because it is solid and unyielding and the tubular piston deflects outwardly and the seal cannot follow the yielding wall. We have attempted to mechanically solve this by a hollow yielding stud, but the piston with its seal still cannot follow the diverging parts and leakage occurs.

In my new concept herein described, stud leakage is eliminated until after considerable cycle life.

It is an object of this invention to provide a liquid spring design in which the seals are actually a compressible solid resilient member which generates compressibility pressures against the wall of said device to provide a continuous high pressure resilient relationship at all pressures and deflections to provide a pressure greater than the liquid used as a compressible liquid in said spring.

It is another object of this invention to provide a method for pressurizing the seal of a liquid spring to an intensity substantially surpassing that of the liquid pressures maintained therein.

It is a further object of this invention to provide a liquid spring and method of assembly for long life comprising providing a seal, groove, liquid combination so as to seal a liquid spring initially through assembly procedures normal to the art, and after assembly, causing said seal material to be expanded by the liquid until such seal is in its compressibility range, and thereafter sealing said seal in said groove against further permeation of said seal expanding material until wear has occurred wherein its compressibility range is lowered to that more closely approximating that of the liquid; after which the seal material is again exposed to the liquid of said spring, and the expander agent therein.

It is the object of this invention to provide a liquid spring, liquid, seal groove-seal combination in which the seal maintains a constant pressure on the spring wall and seal groove greater than the high pressure liquid irrespective of the variation of pressures and changing clearances which the spring encounters during cycling.

It is an object of this invention to provide a bi-liquid contained by a seal for a liquid spring that provides a natural lubricating surface due to slight wetting infused through said seal to the wall of the device, while preventing leakage of the compressible liquid of the bi-liquid.

It is another object of this invention to provide a liquid spring seal which seals primarily because of the compressibility of the elastomer which maintains substantially constant pressure on the wall and not only the intensification in pressure usually associated with most deflectable elastomeric seals.

It is an object of this invention to provide a liquid spring and seal which follows a yielding or deflecting wall with changing clearances, irrespective of the pressure to which the device is subjected, or the suddenness or repetitive aspects of the deflection.

It is an object of this invention to provide a liquid spring seal member which is pre-loaded to its compressibility range after assembly, whereby high interferences can be obtained in the spring without assembly difficulties.

It is another object of this invention to provide a compressible liquid that provides a growth factor in the seal related to its own wear, whereby it continues to seal as it wears with the same pressure on the wall.

It is another object of this invention to provide a liquid spring, liquid spring seal, seal groove, and liquid to grow such seal material to said compressibility range greater than said liquid range and thereafter inhibit said growth until wear occurs.

It is another object of this invention to provide a seal for a liquid spring plus double anti-extrusion wiper ring and seals for the elastomeric seal, whereby wiping of the liquid from the wall is accomplished by pressurized wiper rings.

A related object is prevent of further expansion through sealing said elastomeric seal against further contact with said liquid.

It is another object of this invention to provide a liquid spring seal which is self-lubricating but leakage resistant.

It is another object of this invention to provide a liquid spring seal in which the seal material is in its compressibility range, whereby it can follow the wall at high speed as it yields from normal liquid pressure variations, although the material of construction normally has a poor elastic memory for such movement.

It is an object of this invention to provide a liquid spring in which the compressible liquid has an integral lubricant which will pass through said seal to lubricate the wall, but prevent the passage of compressible liquid.

Another object of this invention is to provide a liquid spring in which the seal can dispense with the usual intensifying shape.

Still another object of this invention is to provide a seal which uses a simple die cut washer as a sealing element.

Yet another object of this invention is a method of expanding any seal to its compressibility range greater than the liquid which it contains.

Yet another object is to provide a seal with greatly intensified sealing pressures due to compressibility of said seal member, but with reduced friction due to a wetting lubricating agent permeating through said seal.

Still further object of this invention is to provide a miscible bi-liquid, one of which is highly compressible, and the other being adapted to permeate through a seal material to expand and lubricate said seal but which will not carry through said seals said compressible liquid.

A further object of this invention is to provide a seal in high compression which will center and act as a bearing for relatively reciprocating parts.

Still a further object of this invention is to provide a seal in which groove tolerances and finishes are not critical.

Still a further object of this invention is to provide a seal which can be rotated in assembly, permitted to gather or corrugate in assembly but which will realign itself under pressure.

These and other objects of this invention will be apparent from the following disclosure.

Figures 1, 2, 2A, 2B:
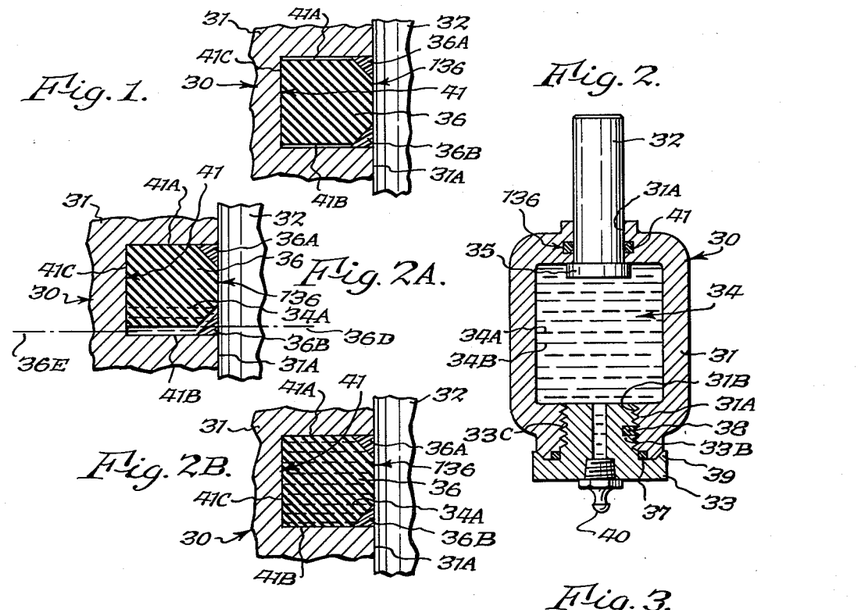
FIGURE 1, is a section, greatly enlarged, of a seal in a liquid spring such as shown in FIGURE 2, but without liquid therein so that the seal is not hydraulically-loaded as is customary in a liquid spring configuration.
FIGURE 2 is a section of a liquid spring employing a female piston seal in the spring, similar to that of FIGURE 1, and further employing a thread seal similar in method of sealing.
FIGURE 2A, is an enlarged section of a seal under initial high hydrostatic pressure in a liquid spring, as such seals are customarily used in liquid springs, showing that the seal has been reduced in volume approximately 6% by internal liquid pressures in this spring following assembly.
FIGURE 2B, is a similar sectional view of the groove and sealing material following expansion and growth after a period of time, despite the internal pressure of the spring, and showing it completely filling the groove, with the seal in its compressibility range wherein the seal is exerting internal pressure against the wall much greater than the liquid which it contains.

FIGURE 2 illustrates a simple liquid spring design having a liquid-seal-groove combination to accomplish the desired seal expansion for wear replacement. This combination forms the essence of my liquid spring invention. This provides long life by utilizing the action of specific liquids in combination with the compressible liquids on a specfic elastomer seal, in a specific groove combination wherein the seal is retained. For this reason, I have arranged that FIGURE 1, which shows an enlarged detailed fragmentary view of the seal itself, with FIGURES 2A and 2B, will illustrate the respective stages in the seal assembly, pressurization and growth from and within the confines of the groove, to accomplish the desired objectives, as is demonstrated graphically by forces and pressures on spring, liquid, and seal in FIGURE 4.

Referring back now to FIGURE 2, we see that this specific liquid spring 30 comprises a chamber 31, piston 32, having a piston preload shoulder 35 preventing the extrusion of piston 32 from out of the bore of the piston when under pressures.

In bore 31A, a seal assembly 136 is retained in a groove 41, as will be described in the detailed fragmentary views 1, 2A, 2B, more clearly. Plug 33 screws into a threaded opening 31B in the chamber 31. A pressure fitting 40 is threaded in cap 33 for replacing liquid during the life of the spring for purposes hereinafter described. Plug 33 is sealed first by an elastomer cylinder 38 inserted in the drilled hole 33B on the thread 33C of the cap and secondly by a seal member 37 retained between cap 33 and cylinder 31 and a wedge shoulder 39 formed on cylinder 31 and cap 39.

Figure 3:
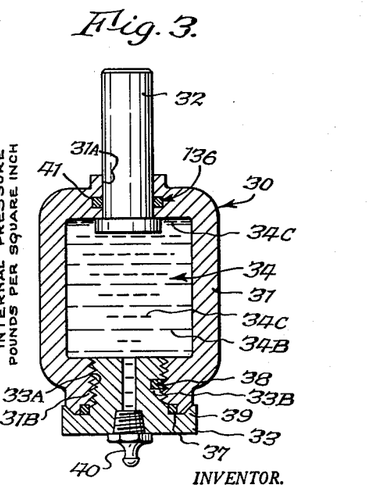
FIGURE 3 is a view of a spring similar to FIGURE 2 and illustrating an identical seal showing the expander material in the liquid of this unit which is incompatible with the fluid, but is caused to affect the seal areas only by positioning said seal and groove with respect to said liquid.

The springs of FIGURE 2 and FIGURE 3 are identical in every respect, with the exception of the liquid 34 which, in the case of FIGURE 2, consists of the miscible expandable liquid 34A into primary compressible liquid 34B. Liquid 34A serves to expand the seal and act as a lubricant. In FIGURE 3, a non-miscible liquid 34C is employed, which floats on liquid 34B because of differences in densities. Compressible liquid 34B or other compressible liquid being denser and not miscible. The function on the specific seal grooves, seal and liquid combinations for the purposes desired, are identical in both devices. In one instance, it is obtained with a bi-liquid, such as liquid 34 of FIGURE 2, and in the other liquid, such as 34 of FIGURE 3, in which the expander element 34B is non-miscible with liquid 34C.

For the detailed action of what takes place in the seal assembly 136, we will first refer to FIGURE 1 and FIGURE 2. In this particular seal-groove combination, an elastomer 36, which in this case is a simple die-cut washer of a suitable elastomeric, such as silicone, buna, urethane or viton, has been inserted in the groove 41. Two, nylon, Teflon, Delrin, or other plastic or the metallic-type anti-extrusion members, such as silver, beryllium copper, are shown as 36A and 36B on both sides of the elastomer 36, despite the fact that exit pressure in this particular type of device is only on the 36A side of the device from liquid pressure exerted against 36B and elastomer 36 from the compressible liquid chamber 31 as shown in FIGURES 2 and 3. Normally, to resist pressure from a single pressurized liquid 34 only anti-extrusion member 36A would be employed. For best results, employ a Teflon seal at 36B and nylon or Delrin at 36A. The Teflon reduces friction to a minimum and its low surface tension removes the compressible liquid 34 from the wall.

As will be noted here, this seal is under no internal pressure at this stage, and the elastomeric element 36 and extrusion members 36A and 36B all are an interference fit against piston 32 and the bottom of seal groove 41C, as is customary in all sealing applications. As heretofore used, initially, there is a clearance at 41A and 41B because the elastomeric seal volume is less than that of the seal groove 41, so that there are places for the elastomer 36 to distort to, after insertion of the elastomeric 36 and the intereference fit of anti-extrusion members 36A and 36B. FIGURE 2A, is an illustration of the seal member 36 in the liquid spring 30 after the liquid is inserted into the liquid spring and placed under its initial preload pressure, say 4,000 p.s.i. In this instance, as happens in all elastomeric applications, the elastomer 36 is compressed in volume, approximately 2%, and pressure applied from the direction of member 36B has forced the elastomeric 36 over against the anti-extrusion member seal 36a, against rear wall 41A of groove 41, and into a greater interference fit with the face 41C of the groove 41 and piston 32.

It will be noted that anti-extrusion member 36B has not moved because the liquid has gradually leaked by it as the pressure increased. This may or may not move slightly, but in general, its interference fit with the piston 32 is greater than the liquid pressure differential between the two sides, as the liquid pressure in the seal groove comes up slowly, because of the normal tight selective fits between the piston member 31 and the bore 31A of cylinder 31. This is the normal configuration of all elastomeric seals in liquid springs in that, at any pressure, the entire force on the piston 32 from seal 36 is the initial interference plus the internal p.s.i. of the liquid spring applied from the direction of element 36B from liquid 34. Normally, as heretofore described, a prescribed clearance has been required on all elastomeric seal applications adjacent the surface 41B, and this clearance is generally from 30% to 50% of the total volume filled by the elastomeric element 36 with relation to the groove 41. This means in normal seal applications, according to recommended practices, it is fundamentally impossible for the elastomeric element to ever completely fill the groove, and in this normal concept of sealing, the elastomeric actually gets reduced in volume as much as 6% as the spring goes up to its end load from the intrusion of the piston 32 into the cylinder 31 and with the compression of the liquid 34 up to 9% by volume at 20,000 p.s.i. At 9% compression by volume of the liquid 34, the elastomeric element such as silicone, buna, urethane, viton, natural rubber, and others, have compressibilities ranging from 6% to 9% in themselves, so that they also reduce in volume by this amount from the liquid pressure of the spring. This is shown in FIGURE 2A by the dot dash line 36D as the position at which this seal would compress from the dot dash line 36E, if the spring was preloaded immediately after insertion of the liquid, so that the elastomeric element 36 would assume the position of that of 36D from its 2% compressibility at this pressure.

It is worthy of note here, that most elastomeric sealing elements are a shape other than square, such as O rings, quad rings, to intensify the pressure from the liquid pressure. Preferably, against the sealing surface 32, the elastomeric 36 has a reduced contact area, so that pressure against the volume of the seal 36 causes sealing at piston 32. Generally, the round O ring shape, or the popular quad ring with four lobes, the C or V type chevron seals all obtain their results by intensification following initial distortion. As will be shown hereinafter, this principle of sealing has created great difficulty with respect to liquid springs, because at the high pressures at which they operate, yielding or deflecting walls present extreme difficulty in yielding faster than the slow memory seal materials can follow. This is particularly true of my tubular spring, U.S. Patent No. 2,909,368, which will be discussed hereinafter, in relation to this new design concept.

Preferably, this concept revolves around the necessity for getting the elastomeric element 36 into its compressibility range, through expanding the seal itself within the groove, up to as much as 30% by volume or greater than the reduction due to maximum liquid pressure expected in the cylinder. Obviously, if such an elastomeric element is at all times maintained at an internal pressure greater than the liquid which it contains, it is physically impossible for that liquid to pass the seal. Hence, we are talking about the necessity for taking the seal into its compressibility range rather than its deflectable or distortable range such as customarily employed with seal elastomers, as in the O ring, quad ring or chevron type commercial seals. In its compressibility range its low elastic memory is not a factor and the seal follows a deflecting wall instantly without delay.

For years prior to this concept of seal growing, this inventor has attempted to find all ways of compressing seals to pressures greater than the maximum liquid spring pressure. The methods tried for pressurizing a seal include:

(1) Mechanically, with screw threads compressing the seal elastomers.

(2) By cooling, and subsequent thermal expansion, and other methods of taking an elastomeric seal element to its actual compressibility range. Previously, seal pressure curves similar to what has been described here has been accomplished with cooling the seal to shrink it, inserting it in the bore and allowing thermal expansion, and is herein described and intended to be covered. In all these methods, friction was very high, reducing spring output. Preferably, in this disclosure it is intended to mitigate wear and compensate for deflection through the growth of the seal chemically in the seal groove of the spring itself to its compressibility range, while providing low friction, as will be hereinafter described in detail.

As has been disclosed above, it has been possible to accomplish the compressibility sealing of an element by utilizing the difference in thermal expansion and contraction of the highly compressible elastomeric and the steel which contains it. However, the elastomeric seal must be ground to precise dimensions to just fit the groove, and the nylon anti-extrusion members are ground and manufactured to such precise dimensions that the entire volume of a seal groove such as 41, is filled with a seal elastomeric 36 and seal members 36A and 36B, which is 105% the groove volume so that the cylinder member with the seal thereon is cooled to a very low temperature, wherein the elastomeric element is shrunk approximately 6% greater than the steel which shrinks only slightly; the unit can be assembled. This is quickly inserted in the bore, and as the temperatures revert to normal, the sealing element goes into compressibility range and obtains the desired compressibility sealing.

However, this method, as with all types of mechanical devices, is commercially impossible to achieve in the liquid spring and presents almost insurmountable difficulties with respect to the various tolerance required in the elements which comprise the seal and groove. While this is theoretically feasible, and has been accomplished mechanically and thermally, it is extremely difficult to obtain, except with the actual molding of the elastomeric seal and extrusion rings in place and machining of the seal assembly after molding to precise dimensions followed by expanding within the groove after assembly by thermal contraction of the seal just prior to assembly.

The above method requires critical assembly times in a threaded center stud configuration of my Patent 2,909,368 shown in views 16 through 24, as the seal expands before it is in place, causing it to corrugate, bunch or tear and locks the assembly prior to proper stud location. If the base of the seal groove is highly polished radially the seal will sometimes seal the outer wall and turn on the smaller diameter shank. It's a difficult procedure at best.

The primary improvement disclosed hereinafter is a method by which the desired results of taking a seal to compressibility pressures can be obtained without the necessity for such precise manufacturing.

The basic features of this invention is the combination between the expander liquid combined with the compressible liquid in the liquid spring, the seal, and proportions of the seal volume with respect to the groove volume it must fill, plus means for sealing off the expander liquid from the elastomeric seal after the liquid has created the necessary internal pressures in the seal by growth in the groove after assembly.

We now refer to FIGURE 2B which details a seal assembly 36 in its compressibility range with the elastomeric seal 36 compressed 9% by volume less than its free volume within the seal groove 41 and generating 25,000 p.s.i. on all sides of the groove 41 and piston 32 wall due to such compression. This initial seal compression could be obtained mechanically or thermally, but I prefer chemical growth to generate such pressures.

Preferably, aromatic additives acting as seal growth materials are added 10% to 20% by volume to compressible siloxanes. This additive takes the seal 36 volume from that of FIGURE 2A to FIGURE 2B.

This growth occurs over a time period after assembly 2 and FIGURE 3 in liquid 34. Preferably, said growth is enhanced by first soaking the seal elastomer 36 in the pure aromatic additive prior to assembly for a brief period of at least an hour, followed by removal of said elastomeric seal 36 and allowing said aromatic additive to evaporate and the seal to resume its original shape and volume. Assembly then follows in the usual sequence after which the expander liquid again causes growth to that of FIGURE 2. This sequence develops the longest life of seals of this configuration.

For a seal member 36 comprising largely buna N or polyurethane, we use a compressible liquid 34 such as silicone and a seal expander liquid 34A of toluene, carbon disulphate, benzol, carbon tetrachloride. For a silicone seal an expander liquid such as .65, 3 or 5 centistokes low molecular weight silicone is utilized. The additive of the seal expander causing chemical growth of the seal inside the liquid spring to the extent that the seal actually obtains its growth to its compressibility range from the permeation of the expander liquid therein with time. The expander element being approximately 10% to 20% by volume more or less determined by the expansion rate required. The sealing element 36 is shown in FIGURE 2B taking into its molecular structure only the expander fluid 34A, and causing an actual growth of said seal member inside the liquid spring while confined under high pressures to the extent that the elastomeric element 36 expands completely filling the groove 41 and expands further by the expander liquid until it is actually grown to a compressibility pressure greater than the end liquid pressure in the spring which it seals. This actual condition will be described in some detail hereinafter, in which we describe the tests which this inventor pursued to obtain the proof that the seal growth was actually the method by which the seal obtained its superior sealing characteristics, through its generated compressibility pressures.

We thus see that in place of the deflectable, distortable seal elastomer element in an oversize groove, such as customarily employed in liquid springs, we have utilized a seal member 36, which almost fills the confines of the groove, seal 36 being initially 90 to 95% of groove volume, which is exactly contrary to the normal sealing practice taught by all seal manufacturers. The initial sealing of the liquid spring is obtained in the manner customarily used for the sealing of any hydraulic device, in that the elastomeric element 36 is actually an interference fit with the elements, in its distortable or deflectable shape, but is not in its compressible condition, as discussed herein.

In this condition the seal can be slightly corrugated, twisted or pinched as customarily occurs in some installation sequences. Under such assembly difficulties, leakage often occurs immediately on cycling.

These difficulties can sometimes be overcome by polishing the groove to fine finishes and having a perfectly concentric groove. The sealing techniques of the subsequent pages do not need these critical finishes and tolerances.

Referring now to FIGURE 2B, we note that the seal groove has now been completely filled and actually, the elastomeric seal 36 is actually greater in volume than the groove 41. This condition has been brought about by seal growth after a two-day wait from initial assembly. Holding the spring compressed or subjecting it to high liquid pressures due to elevated temperatures appears to accelerate such growth.

Therefore, by virtue of a required time period before said liquid springs are put in service, the compressible bi-liquid actually permeates only its seal expander material 34A or 34C, into the seal 36 wherein the seal itself actually fills completely the confines of the groove 41, and grows further until it is a compressible element in itself within groove 41, pressurizing the yielding wall to the extent that the liquid contained in the liquid spring cannot pass therethrough when cycled.

It shall be further evident, as will be described hereinafter, that the sealing element further, after completely filling the groove, inhibits further passage of the liquid expander element into the seal whereby the seal cannot be destroyed from continuous growth as it can be realized in a free expander liquid with some of the sealing elements of the type described. This system then makes normal use of commercial tolerances which do not require the precision fits and precision parts heretofore associated with any potential use of a compressible element in the sealing of a liquid spring, and further allows a chemical growth of the seal within the spring to fill whatever tolerance variations there may be in the containing grooves and anti-extrusion members of the device, thereby utilizing standard commercial tolerances, standard parts, standard assembly procedures, and ease of assembly which cannot be accomplished with any other known method of pressurizing the seal elastomeric element to a pressure greater than the liquid which it contains.

In FIGURE 3, it is illustrated that these liquids need not be miscible, it is possible to put the expander element 34C, into a non-miscible liquid 34, and by proper orientation of the dynamic seal of the device, with respect to the different specific gravities of the non-miscible liquids, the desired growth can be accomplished. It is thus possible, in this same configuration, to orient the spring in directions to obtain the desired growth orienting the spring alternately, so that the expander element attacks first the static, and then the other dynamic sealing element until it is expanded in growth, thereafter operating the spring as normal, except that such dynamic seal should be in proximity to the expander liquid to compensate by growth for wear. Of course, the same method can be employed to insert expander 34A into a spring previously filled with a liquid 34B and they will then be miscible and activated after shelf time.

Further use of this technique is exhibited by the method of sealing threads of a liquid spring plug or cap 33 in FIGURE 2 and FIGURE 3. In this thread plug 33, a small elastomeric element or insert 38 cylindrical in shape, is inserted into a drilled hole in the plug 33 and its thread 33A, so it is just touching the thread of bore 31B. As the liquid expands the sealing element 38, it expands completely filling the thread path and prevents leakage of the spring therefrom, and further locks plug 33 to cylinder 31 through chemical growth.

A secondary sealing element 37 and a third anti-extrusion collar 39, while shown, aren't necessary to sealing being mostly fail safe features. The expanding of the elastomeric element 33 completely filling the gap in the thread, and preventing the passage of liquid therethrough.

Insert 33 could also be an annular ring is desired, but in most instances, the small insert which is shown here provides the dual feature of anti-thread rotation and sealing. Obviously, if liquid did pass insert 33, it would expand ring 37 with like results or ring seal 37 could be used alone.

Figure 4:
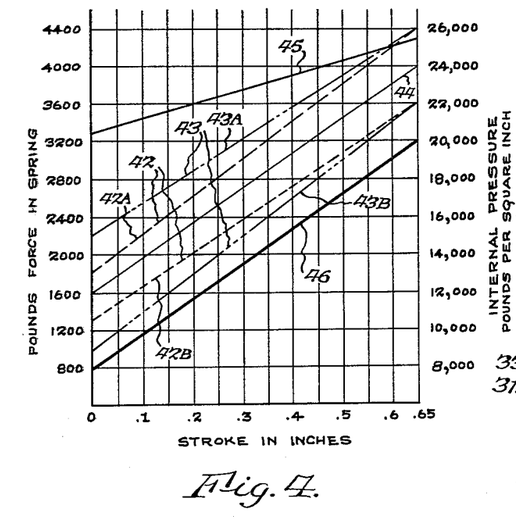
FIGURE 4 is a graphical representation of the characteristics of the seals of FIGURE 2A, 2B, in the liquid spring of FIGURE 2 illustrating spring, friction, and seal forces as compared with liquid and seal pressures in the spring.

Referring now to FIGURE 4, actual graphical representation of this accomplishment in liquid spring design and sealing is demonstrated from an actual physical test of a given liquid spring similar to the configuration of FIGURE 2, and also FIGURE 3, in which piston 32 has approximately a diameter of .5", area of .2 sq. in. approximately, and a cylindrical chamber of approximately 1¾ in. diameter, 2" long, containing a volume of 10% by volume compressible liquid.

A standard liquid spring 30 of this configuration has a spring rate curve which is an average between the upper limits of the input force including compressibility plus the seal friction, and the output force which is compressibility less friction as the spring extends. When compressing the spring, actual force due to compressibility is a curve, but shown here, for illustration as a straight line 44, representing theoretically a 100% efficient liquid spring. In actual practice, this is not a straight line because it diverges slightly due to the fact that compressible liquids are less compressible as they are compressed. A normal hysteresis curve from such a liquid spring, using conventional seals is shown by the lines 42, comprising line 42A, 42B respectively, line 42A, being the compression force of a liquid spring of FIGURE 2, and FIGURE 3, and the line 42B being the extension stroke, a difference between the straight line 44 or compressibility curve being the amount of friction going in and out or hysteresis loop 42, as it is known in the art.

It will be observed that in the customary deflectable type seal, which for purposes of illustration, can be called identical to FIGURE 2A, (although volume clearances are below minimum), would provide a curve 42 approximately as shown herein in which the actual curves of the spring are as documented by the lines 42A and 42B. It will be noted that the friction or hysteresis losses initially, are much less than as will be hereinafter described for the compressible seal of my invention, and that they diverge as pressures go up.

In other words, since this seal generates the applied liquid pressure on the wall, the seal pressure will go only to a pressure equal to its original interference plus the hydraulic pressure applied thereto, as intensified by the design shape of the seal, which unlike FIGURE 2 would be an O ring type or quad ring, in which pressure is intensified at the sealing surface because of change in areas and initial elastic interference.

Now, FIGURE 2A, illustrates minimum clearances with respect to such a seal. Actual cycling of the spring with clearances shown in FIGURE 2A would provide unsatisfactory life. More clearance would have to be allowed to make certain that liquid pressure at all times would intensify the force on the seal member itself. The forces shown herein as hysteresis loop 42 is true of every type of deflectable seal member, and vary only slightly with respect to the co-efficient of friction of the seal for the wall and design shape employed.

We now refer to the seal element 36, shown in FIGURE 2B, and as described hereintofore, in which the seal element 36 has actually been expanded by the addition of the seal expander liquid 34A in the compressible liquid 34, so that it actually is in its compressibility range against the wall of the spring itself from chemical growth within the seal groove due to the expander element 34A. This then results in almost constant friction being applied to the wall, since the expansion of the seal is obtained chemically and not with respect to the intensification of the pressure in the liquid spring as the piston is deflected and the pressure increased.

We thus see that seal hysteresis loop is constant and predictable depending on the volume in the seal material and the percentage of expander to which it is allowed to be subjected. Curves 43A and 43B are comparable to curves 42A and 42B and illustrate quite conclusively that the force of the seal on the wall is irrespective of the internal pressures such as has caused the variation in curves 42A and 42B. Now the right-hand ordinate of the graph denotes p.s.i. with the abscissa, the stroke in inches for this particular device to illustrate actual liquid pressure, with respect to internal seal pressures in the device as described herein. We thus see that curve 45 represents the internal p.s.i. of the seal element 36 itself, and curve 46 represents the liquid compressibility as liquid pressures increase with stroke of the piston into the cylinder, and the reduction in total volume thereto.

Now, it will be noted that the curve 45 is essentially a straight line. However, there is a slight intensification of pressure due to the influence of nylon anti-extrusion member 36B against said elastomer 36 which tends to supplement the compressibility in the seal by intensification of the applied liquid pressure.

This graphical representation of FIGURE 4, illustrates completely the manner in which the seal element behaves. The choice of the springs of FIGURE 2 and FIGURE 3 on the graphical representation hereto, was specifically chosen because of the heavy walled nature of the end of cylinder 31 wherein deflection of the wall itself is at a minimum because of the heavy structural strength of the end member. This then eliminates largely the deflection commonly in springs such as my tubular design, U.S. Patent No. 2,909,368 and for purposes of illustration indicates the degree to which this compressibility of the elastomeric element can be put to use, using expander liquid and seal groove dimensions in the right proportions.

Figure 5:
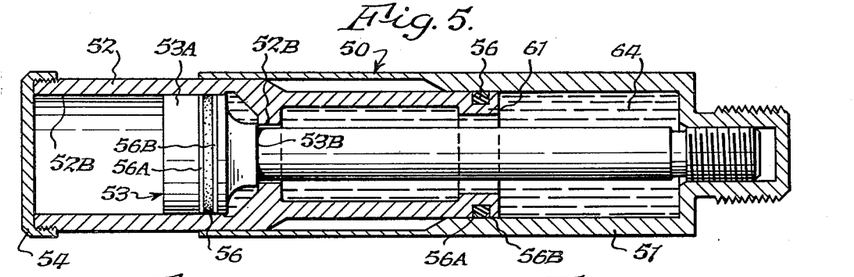
FIGURE 5 is a longitudinal section of a step tubular piston spring, similar to that shown in my issued U.S. Patent, No. 2,909,368, using the new liquid, seal, groove combination.

Having thus shown in simple form the manner in which this seal functions, we will now refer to other spring configurations, and advantages that may be gained thereto, particularly with respect to the tubular construction shown in U.S. Patent No. 2,909,368. In FIGURE 5, I have illustrated a liquid spring 50, having the cylinder 51, step tubular piston 52, and a stud member or central closure member 53, and an end cap 54 for the tubular piston 52. A compressible liquid 64 is contained between the stud head member cap 53A and stud 53 and the cylinder 51, as is customary in that design. An orifice dashpot head 52B is illustrated adjacent the stud head and acting as a stop against preload pressures tending to extrude piston 52 from cylinder 51; stud 53 being the retention means through shoulder 53B. Piston 52 is coated with nylon as is stud head 53A in the manner of my Patent #2,909,368.

Preferably, the compressible liquid 64 contains the compressible liquid di-methyl siloxane, and in this case, a Buna seal 56, having nylon extrusion members 56A and 56B respectively and sectional views, FIGURES 6, 7, 8, 9, 10 being respectively views of the stud seal 56 and the stud head 53A of the stud member 53, illustrating stages in the development and growth of this seal according to the teachings that were hereintofore discussed in the previous illustrations in this specification.

Figure 6:
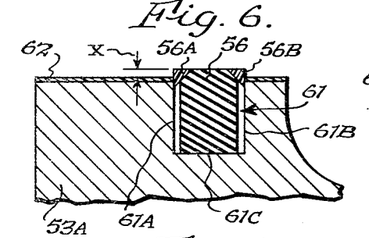
FIGURE 6 illustrates, enlarged, a seal on such a liquid spring piston without the cylinder containing the seal, showing how said seal is in elastic expansion greater than the bore which it will contain, but it not yet in its compressibility range.

FIGURE 6 illustrates a seal member identical to that previously disclosed comprising a simple buna elastomeric washer 56 which can be exactly rectangular in cross-section or can be beveled at the corners to more easily accommodate nylon washer members 56A and 56B for anti-extrusion purposes after growth. Preferably, I prefer that this is a simple die cut washer without such notched corners, and that it obtains this shape by deflection of the rectangular cross-section. However, this method of expansion and sealing has worked nearly as well with standard O rings, quad rings, etc. where the dimensions made allowances for the reduced volume of the intensifying shape of the standard seals. Slight differences in life is due to less seal area contact; the washer ring actually outlasting the usual superior intensifying seal. FIGURE 6 illustrates this seal prior to assembly of the device. The actual expansion and elastic deformation is equivalent roughly to only .010 inch to .015 inch interference in say, a 1 inch diameter bore in piston 52, so that the seal elastomeric element 56 and extrusion rings 56A and 56B in FIGURE 6 extend above said piston 53 surface, a distance X which is approximately .010 inch to .015 inch on a side. It should be obvious that the volume of the clearances at 61A and 61B is substantially greater than the confined groove after installing the piston and seal in the cylinder, as is shown in FIGURE 7, in which clearances at 61A, 61B are still shown although smaller on either side of the seal member 56, as it is confined, prior to any pressure in liquid 64.

Figure 7:
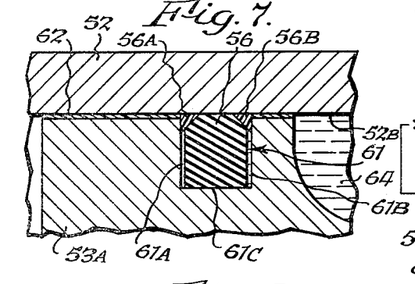
FIGURE 7 is a similar view with the seal in the cylinder not yet under the high liquid pressure associated with liquid springs so that it is only elastically deformed but not under pressure or reduced in volume.

It will be noted that the gap at 61A and 61B has narrowed because of the reduction in diameter of the seal 56 and extrusion back ups 56A, 56B, from FIGURE 6 to FIGURE 7, and is still not filling the groove 61. An idea of the critical nature of the seal groove tolerances can be gained by the fact that it is customarily difficult to machine the groove closed than ±.005 inch in width and depth, and closer diametrically than plus or minus .0015 inch and even such tolerances as are mentioned here, are close. Obviously, then a seal that projects only .010 inch to .015 inch interference, prior to insertion, and varies ±10% by volume, cannot be controlled so accurately as to completely fill the groove in its compressibility state by mechanical means, without selective fitting or premolding.

It is obvious, the accumulative tolerances of all the elements of the liquid spring mitigate against this, when the normal manufacturing tolerances of the buna elastomeric 56, which is ±.010 inch in diameter and cross-section or 10% by volume, and the anti-extrusion members 56A and 56B are impossible to control closer than .002 inch, so that it is physically impossible to mechanically load the seal to its compressibility range in the configuration shown, without some adjustable means.

Figure 8:
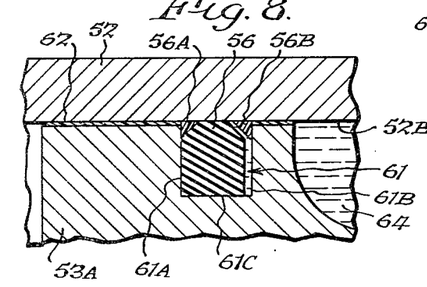
FIGURE 8 is a similar view of a spring under high pressure illustrating its reduced volume due to the liquid reducing its volume as it goes through its compressibility range, but still without the seal expanding or said groove being filled.

Now, in FIGURE 8, I show the same seal being subjected to the preload pressure from the chamber in liquid 64 which causes it to fit tightly against side 61A of groove 61, and against the bottom 61C of groove 61, and its compressibility providing clearance 61B due to the pressure of the liquid therein. Since seal 56 is reduced in volume approximately 2% with normal preload pressures of 4,000 p.s.i.

Figure 9:
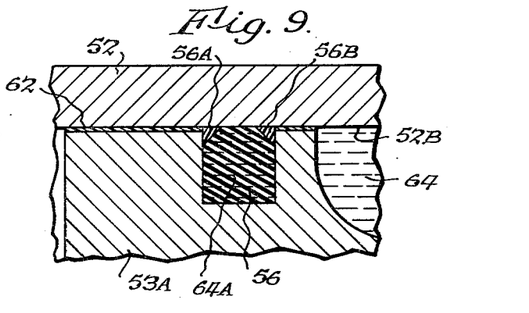
FIGURE 9 is a view similar to FIGURE 8 and showing the seal, seal groove, liquid combination of my invention in which the seal has been expanded to its compressibility range against said high liquid pressure within the confining seal groove and extrusion members, and then, further sealing itself against said groove and extrusion retainer rings against further permeation of the expander liquid from the compressible bi-liquid.

Referring now to FIGURE 9, we will see the same seal element 56 after being subjected to the expander liquid 64A in said liquid 64 which causes seal 56 to expand to its compressibility state as shown in FIGURE 9, completely filling the groove, and exerting its own compressibility pressure against the wall of piston 52. There is now no possibility of the leakage of the fluid 64, as the spring is cycled, since the pressure generated against the wall of piston 52 by compressibility of seal 56, far exceeds internal pressure of the compressible liquid 64.

Figure 10:
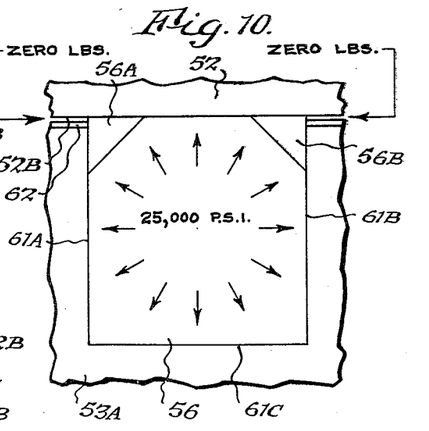
FIGURE 10 is a greatly enlarged sectional view and diagrammatic illustration of a seal similar to FIGURE 9, in which all external pressure has been removed from the device so that said seal is under no external pressure to intensify its force, but which seal is generating in excess of 25,000 p.s.i. from its own expansion due to exposure to said seal expander material.

It should be noted here, that not only has this expander liquid 64A expanded the seal as shown, but the molecular association of the liquids such as toluene for a buna or urethane seal 56 has caused the co-efficient of friction on the wall 52B of cylinder 52 to be lowered approximately ⅓ of that which it was previously, as well as expanding it by removing all liquid from the spring, either by removal from a filler plug or backing off the threaded stud member 53, or cooling said element to remove all liquid pressure, we have determined that the actual friction load on the seal with all pressure removed, as shown in FIGURE 10, is such that while the friction force is low, from the co-efficient of friction, it can be deduced, that seal element 56 is itself at an internal pressure of 25,000 p.s.i., due to said growth from said seal expansion. Further proof of this will be apparent from the succeeding views of FIGURES 11, 12, 13, 14, and 15, as will be described hereinafter.

Figures 11, 12:
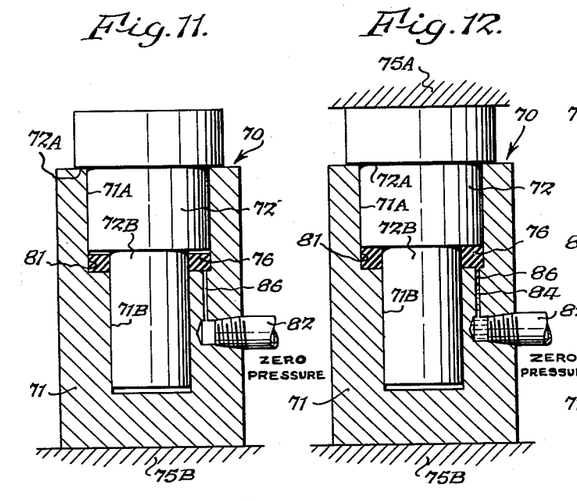
FIGURE 11, is a sectional view of a seal expansion test fixture with the seal inserted, but in its initial unexpanded configuration therein.
FIGURE 12 is a similar view of the fixture being contained and showing the seal partially expanded to completely fill the cavity after being subject to expander liquid but without external liquid pressure applied thereto.

For illustrating, the actual pressures on the sealing element, outside the liquid spring, I had designed and built the seal containment fixture 70 shown in FIGURE 11 comprising a step piston 72 having a bottom shoulder 72A, a step stem member 72B having a difference equal to the cross section of an elastomeric element 76 made out of, say buna, silicone, or urethane, and so designed that when bottomed against shoulder 72A, the volume 81, therein is approximately 20% greater than the elastomeric element 76. Shank 72B, being a tight diamond-lapped fit in bore 71B and piston 72 being a tight lapped fit in bore 71A with heavy minimum deflecting elements, so that the seal 76 can be contained therein without any anti-extrusion members. An ultra small passage 84 connects with a pipe fitting 82, through which liquid can be inserted at atmospheric pressures.

FIGURE 11 is a representation after initial insertion of the seal element 81 and the piston member 72, into the cylinder 71, prior to subjecting it to the expander liquid 84 through pipe 82.

Figure 13:
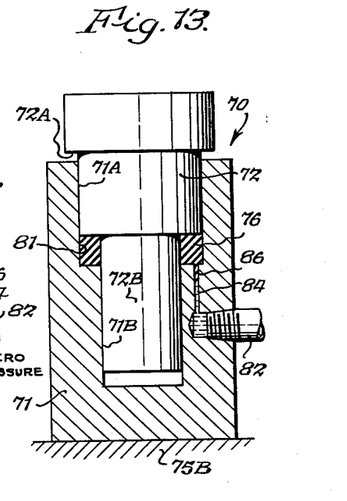
FIGURE 13 is a similar view showing the seal fully grown with the seal lifting the plunger of the die cavity in the fixture, from its own internal generated expansion, no fluid pressure being applied thereto.

FIGURE 12 is a view utilized to show the seal growth while the seal is completely contained in the die element 70, the piston 72 being held down in position by a ram 75A and the base 75B, while the seal 76 is being subjected to the liquid 84 through the pipe 82. It will be noted herein that the seal member has completely filled the cavity 81, in which before it had a 20% clearance by volume, and has begun to extrude into the ultra small bore 86. FIGURE 13 illustrates how, after an elapsed time, with removal of the pressure, the piston element 72 is caused to move out of the cylinder from the pressure generated by the growth of the seal 76 itself. For investigating maximum pressures, a seal extrusion ring proved necessary.

Figures 14, 15:
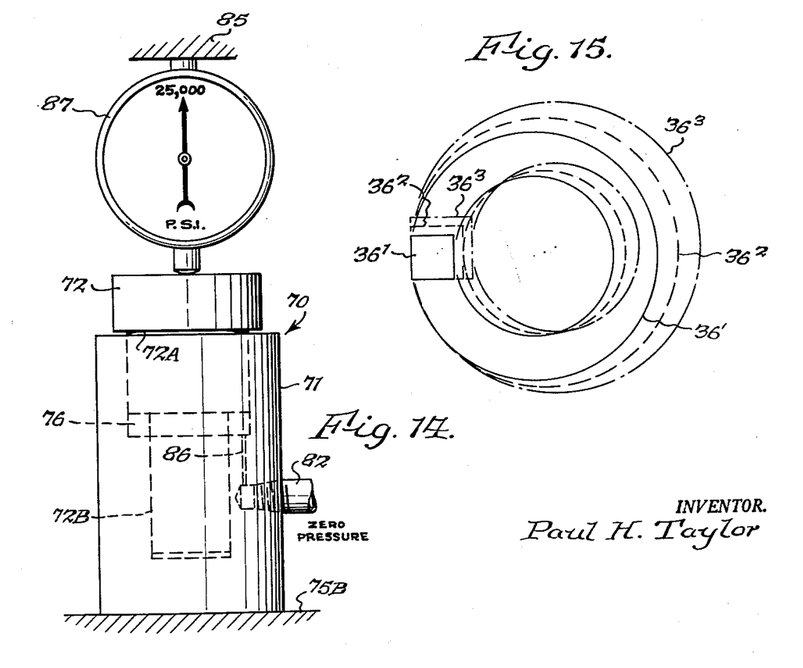
FIGURE 14 illustrates the pressure reading of the expanded seal, to illustrate that said seal is its own servo mechanism for creating high sealing pressures.
FIGURE 15 is a diagrammatical view of a seal unexpanded, as initially exposed to the liquid growth, then after one day's exposure and then after two days; the growth being approximately 18% greater than its original volume.

FIGURE 14 illustrates an actual p.s.i. reading of 25,000 p.s.i. The gauge 87, piston 72, and containment fixture sidering the volume there, in this particular instance, that the seal had generated internal pressure exceeding 30,000 p.s.i. The gauge 87, piston 72, and contaminant fixture 70 being confined between a ram 85 and base 75B.

Now, considering the expansion of the seal in free liquid of the expander 94, we refer to FIGURE 15, which illustrates at 36¹ the condition of the seal prior to the application of any expander liquid thereto. At 36² the condition that existed after two days, and 36³ the condition after three days, at which time the material attained its growth shown, and did not grow further. This is typical of the chemical expansion of seals in free liquid outside of the confinement and containment of the grooves 81, which have been herein discussed. It should be noted here that in the condition 36³ the seal is expanded too far. It has begun to break down the molecular structure of the elastomeric element itself from the expander fluid 84. Preferably, this condition should not exist in liquid springs for primary wear, and hence the limitation on the size of the groove which is dictated by the fact that the spring must initially seal by the deflectable characteristics previously known in the art, and thereafter grow to completely fill said groove, and not grow to the extent where it can be damaged through excessive growth.

Figure 16:
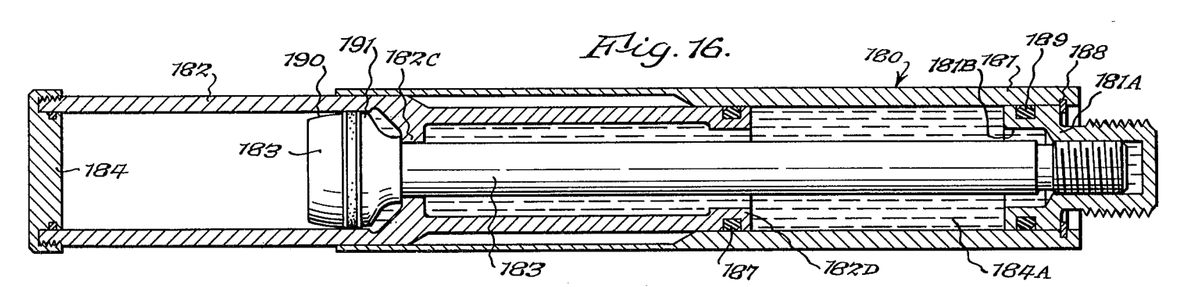
FIGURE 16 is a view of a similar tubular liquid spring under its preload with said seal expander material in said compressible liquid.

Referring now to FIGURE 16, I have illustrated a tubular piston arrangement modified slightly from that of FIGURE 5 and that shown in my U.S. Patent No. 2,909,-368. This spring-shock 180 comprises a cylinder 181, piston 182, a central closing stud 183 and a cap 184. The dashpot shock absorber face 182C is positioned midway of the tubular piston 182 rather than being in proximity to the end 182D. Under high shock configurations, such as liquid spring shocks, or straight shock absorbers, such dashpot location is often desirable. Utilization of a dashpot head such as shown here means that under high impact loads, such as associated with violent shocks, all the pressure is ahead of the dashpot head 182C, and high pressure is only applied to the seal member 187, at piston extremity 182D. Thus, since all the wear is only on the one seal 187, it is desirable that the wear on this particular seal 187, is compensated to provide very long life such as is customarily required for commercial dashpots or shock absorbers. To this end, I utilize the seal 187, 196 expander liquid 184A relationship previously disclosed and intensified still further, through the expanding characteristic of said hollow piston.

The cylinder 180 is a straight tubular member made from commercial or aircraft tubing providing member 181; a cylinder cap member 181A is sealed by seal 189 which is intended to expand in the method previously disclosed. Heretofore, this two-piece construction was avoided in high pressure liquid springs because the static seals provided one more leakage path. The novel construction herein consists of the pressure balanced stud member 183 having the enlarged head 190 with the seal arrangement 196 therein according to previous teachings of this specification with anti-extrusion members 196A and 196B. A center tie or reduced stud member 183A threadedly engages cap member 181A. This assembly then contains the liquid pressure except for the unbalance equal to the piston area. This small net force is carried by snap ring 188 which prevents cap 181A moving out of cylinder tube 181. This simple construction permits low cost construction particularly in very large liquid springs or units with low spring loads.

Referring now to stud head 190, another novel advantage of the new seal-liquid-groove combination can be illustrated. Steel wearing on steel in the presence of high pressure dimethyl siloxane is an impossibility as galling occurs. To avoid this, I have heretofore used plastic coated relatively moving elements such as in my Patent #2,909,368. Such methods add costs to liquid springs in this design. Stud head 190 is not coated, the seal 196 itself centering the stud head 190 and preventing the tight fitting parts from galling. The radius end 190 assures close fitting metal parts only at the seal groove so slight misalignment will not cause metallic contact at the extremities during assembly. The seal growth to compressibility prior to operation, creates a very high centering force to prevent metallic contact at the seal groove edge thus eliminating the previously necessary plastic coating, and its element of cost.

Prior to this, an uncoated stud would bear on one side and gall destroying the super finished bore and the spring would leak. In test after test, on this construction with the new seal-groove-liquid combination, no galling or leakage occurred.

Figures 17, 19:
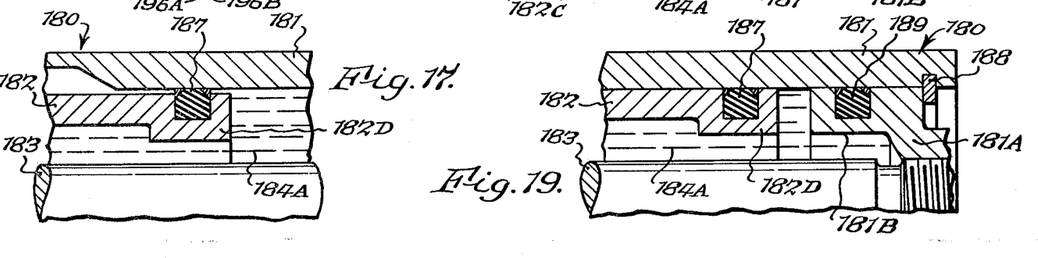
FIGURE 17 is a greatly enlarged partial view of the seal area showing how the cylinder wall is deflected outward, and the piston wall inward by the pressure generated within the piston seal itself after time exposure to the liquid expander.
FIGURE 19 is an enlarged sectional view of FIGURE 18 under the high internal pressure of the liquid spring when compressed, illustrating how the seal material has been caused to increase its pressure by the effect of the piston wall deflection from the internal pressure.
Figure 18:
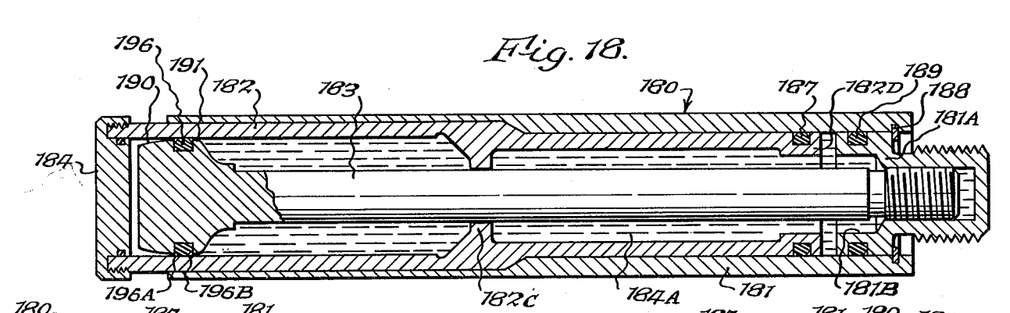
FIGURE 18 illustrates the spring under full compression with the piston seal compressed by piston deflection.

Referring to FIGURE 17, which is an enlarged detail of the seal 187 configuration of FIGURE 16, it will be noted that the expansion of the elastomeric seal 187 has actually yielded the piston 182 inwardly and the cylinder 181 outwardly to provide a clearance. Thus, as the spring 180 attains the position shown in FIGURE 18, at the bottom of its stroke, the pressure reaches its maximum intensity, and the intensification of the pressure inside the thin tubular piston 182 forward of the dashpot face 182D causes the entire area on either side of the seal to be effective as a pressurizing agent or intensify device so that the seal is compressed further into its compressibility range, actually farther than the expanding liquid alone will take it. The seal then, as shown in FIGURE 18, attains the condition shown in FIGURE 19, so that the piston wall is supported by the cylinder and the seal has been compressed still further in its groove.

In FIGURES 20 through 24, I illustrate seal configurations that require still lower co-efficients of friction than that of the expanded Buna, urethane, or silicone in the teachings I have so far disclosed. While the co-efficient of friction on the devices herein disclosed is ⅓ that of the prior, conventional Buna or silicone seals, through the lubricated seal, pressure is high, so friction levels are also high. However, if it is desired to get friction below that of the conventional seal, it has been deemed desirable to use extremely low friction bearing material such as Teflon, to act as a wearing surface of the cylinder wall and prevent leakage thereby. Normally, a Teflon tire seal of this configuration, using a deflectable seal thereunder, has less friction but leaks sooner than a Buna or urethane seal working directly on said wall. Generally, 20,000 cycles are a great many in such use.

FIGURES 20 through 24 are devoted to the above types of expander or servo seal configurations, the method by which this chemical expansion in the seal can be utilized and provide still better low friction sealing configurations.

Figures 20, 22, 24, 25:
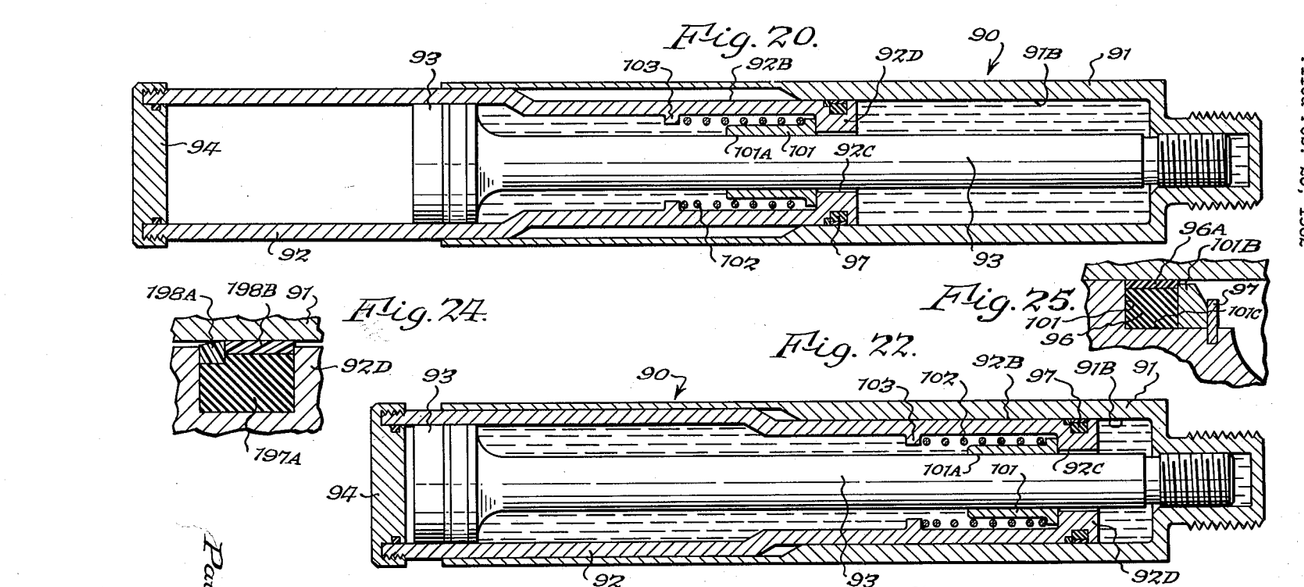
FIGURE 20 illustrates a preloaded spring, in this instance, employing a seal configuration similar to that previously disclosed, but having a low friction seal cap for still lower friction seal and which is supported by a nylon anti-extrusion member at the pressure exit side of said seal member, and employing a slow return valve.
FIGURE 22 is a sectional view of the spring of FIGURE 20 under high pressure at the end of its stroke.
FIGURE 24 is a sectional view of a modified anti-extrusion arrangement.
FIGURE 25 is a view of a separable, moveable lip which contains the seal at compressibility pressures, but will compress the elastomer when pressures exceed seal compressibility pressures.

In FIGURE 20, I have a liquid spring 90 and a cylinder 91, piston 92, central closing stud 93, closure cap 94, and further employing a non-return valve 101, that seals at the dashpot head 92D located at the forward location of the piston. Valve 101 has been biased by spring 102, acting from shoulder 103 in piston 92. The purpose of this non-return valve is to close off the return flow of the liquid after compression so that the liquid spring-shock can return very slowly from the metered flow of liquid underneath the valves or between the clearance between the valve 101, and the stud shank 93. A typical seal 97 is on piston 92.

In FIGURES 20 through 24 are illustrated Teflon cap or tire seals 98B, 198B adapted to present a low friction surface to cylinder bore 91B and to be pressurized from growth of seals 97, 197A as described hereinbefore.

Figure 21:
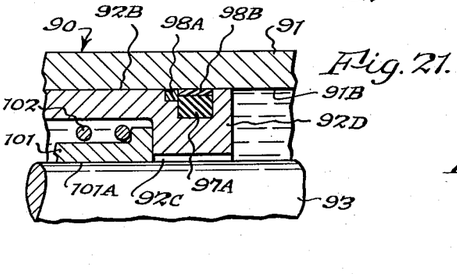
FIGURE 21 is a greatly enlarged view of said seal arrangement at preload pressure.

FIGURE 21 is a view in sectional detail of FIGURE 20, and illustrates how, at preload, the piston wall is largely adjacent the cylinder wall. As is customary in a preloaded device, there may be some deflection here of cylinder wall 91B away from piston wall 92B. Since the end dashpot face 92D of piston 92 is reinforced by its inward facing dashpot, it yields little.

Figure 23:
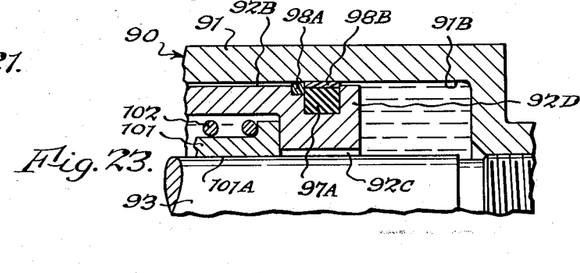
FIGURE 23 is a view of the seal as expanded at the end of such stroke to follow the deflecting wall with high pressures.

Referring now to FIGURE 23, an enlarged portion of FIGURE 22, it will be noted that at the end of the stroke which is illustrated here, the cylinder wall 91B is deflected outwardly, while the stiffer piston wall, due to the end wall strength of dashpot 92D, has remained largely at the same diameter. This then causes the yielding or clearance between the two walls, which can be disastrous if not corrected or accommodated by the seal.

FIGURE 23 illustrates how the nylon extrusion ring 98A has been deflected until it is in sealing contact with the wall, even though said wall has deflected away from it, preventing extrusion of the Teflon tire seal 98B. For purposes of operation of this spring-shock, it will be noted that the non-return valve 101 allows passage of fluid through orifice 92C so that the piston is free to move on compression loads rapidly as flow through orifice 92C takes place by the valve 101 opening. Valve 101 not being restraining or restricting for liquid flow, on compression. At the end of the stroke as shown in FIGURE 23, this valve is biased closed by spring 102 causing it to seal, except for slow metered flow through orifice 101A.

We will now make a particular reference to the small, enlarged sectional view of FIGURE 24, a modified seal configuration. This shows an elastomeric element 197A having an anti-extrusion member 198A composed largely of say, nylon, and the wearing low friction tire seal 198B, comprising Teflon, which prevents the extrusion of the expanded elastomeric element 197A towards the high pressure liquid and prevents its contact with the wall of the liquid spring, while accepting expandable liquid from the spring to pressurize it to high sealing pressures against the wall.

In FIGURE 25, it will be noted that stud head 93 has a seal groove 101 and a loose slideable shoulder 101B on the pressure side. Element 96 is slideable on shoulder 101C from liquid pressure but is restrained by snap ring 97 against movement from seal expansion. Thus in a liquid spring utilizing maximum pressures beyond the expansion pressures of a seal ring from growth; the seal 96 would be pressurized to greater pressures since ring 101B is slideable against seal 96, 96A.

Having thus described my invention, I claim:

1. In a liquid spring including a cylinder member and an internal member within the cylinder member cooperating to define a chamber containing liquid means, the spring relying upon compressibility of liquid for its resilience, an improvement comprising: a groove formed in one of said members between said one member and the other of said members, and seal means formed of expandable material seated in said groove, said liquid means including at least one liquid which is effective upon said expandable material to cause said seal means to increase in volume and exert a predetermined seal pressure between said members in excess of the pressure exerted upon said liquid means by compression during normal operation of the liquid spring.

2. The improvement in liquid spring of claim 1 further characterized in that said expandable material comprises an elastomeric material, said liquid means including another liquid having predetermined compressibility characteristics, said one liquid being effective to react chemically with said elastomeric material and cause it to increase in volume.

3. In a liquid spring including a cylinder having a bore formed therein and a piston slidable in said bore cooperating to define a chamber containing liquid means, the spring relying upon compressibility of liquid means for its resilience, an improvement comprising: a groove formed in the periphery of said piston between said piston and said bore, and seal means formed of expandable material having relatively poor elastic memory seated in said groove, said liquid means including a liquid which is effective upon said expandable material to cause said seal means to increase in volume and exert a predetermined sealing pressure between said piston and said bore in excess of the pressure exerted upon said liquid means by compression during normal operation of the liquid spring and into a compressibility range where the seal instantly follows bore surface deflections without the benefit of plastic memory.

4. The improvement in liquid spring of claim 3 further characterized in that said expandable material is a silicone material, and said liquid is a chemical which reacts with said silicone material to cause it to increase in volume.

5. The improvement in liquid spring of claim 3 further characterized in that the volume of said seal means is in the neighborhood of 90% of the volume defined by said groove before it is expanded by said liquid.

6. In a liquid spring including a cylinder having a bore formed therein and a piston slidable in said bore cooperating to define a chamber, the improvement comprising: a groove formed in the periphery of said piston between said piston and said bore, a seal assembly seated in said groove, said seal assembly including seal means formed of elastomeric material and ring means for preventing extrusion of said elastomeric material from between said piston and said bore, and liquid means in said chamber, said liquid means including compressible liquid and expander liquid, said expander liquid being effective upon said elastomeric material to cause said seal means to increase in volume and exert a predetermined seal pressure between said piston and said bore.

7. The improvement in liquid spring of claim 6 further characterized in that said ring means comprises a pair of anti-extrusion rings overlying said seal means.

8. In a liquid spring including a cylinder member and an internal member within the cylinder member cooperating to define a chamber, the improvement comprising: a groove formed in one of said members between said one member and the other of said members, seal means formed of expandable material seated in said groove, and liquid means in said chamber, said liquid means including a compressible liquid and an expander liquid, said expander liquid comprising not more than 20% by volume of said liquid means and being effective upon said expandable material to cause said seal means to increase in volume and exert a predetermined sealing pressure between said members.

9. The improvement in liquid spring of claim 8 further characterized in that the volume of said seal means is at least 60% but not more than 90% of the volume of said groove before said seal means is expanded by said expander liquid.

10. The improvement in liquid spring of claim 8 further characterized in that said expandable material comprises an elastomeric material and said expander liquid comprises an aeromatic hydrocarbon.

11. The improvement in liquid spring of claim 8 further characterized in that said expandable material comprises a silicone material and said expander liquid comprises low centistoke, highly compressible dimethyl siloxane.

12. In a liquid spring including a cylinder having a bore formed therein and a piston slidable in said bore cooperating to define a chamber, the improvement comprising: a groove formed in the periphery of said piston between said piston and said bore, seal means formed of expandable material seated in said groove, anti-extrusion means encircling said seal means in said groove, and liquid means in said chamber, said liquid means including an expander liquid which is effective when it contacts said expandable material to cause growth of said material and cause said seal means to increase in volume and effect a seal of predetermined sealing pressure between said piston and said bore in excess of the pressure exerted upon said liquid means by compression during normal operation of the liquid spring, the development of said predetermined pressure by said seal means being effective to prevent further effective contact between said expander liquid and said expandable material so that further expansion of said seal means is forestalled.

13. The improvement in liquid spring of claim 12 further characterized in that said expander liquid is also a lubricating liquid which serves to decrease the coefficient of friction between said seal means and said bore.

14. A liquid spring comprising a chamber, piston means reciprocable in said chamber for pressurizing said chamber, said piston having a seal groove and seal therebetween, and a compressible liquid contained between said piston means and said chamber, said liquid containing a percentage of expander liquid capable of expanding said seal in said groove to a pressure exceeding said liquid pressure in said spring in the range of temperatures and pressures encountered during normal operation of the spring, said expander liquid being of sufficient volume to apply pressure from seal growth substantially over the range of pressure of said compressible material whereby said seal pressure remains substantially constant at a pressure level exceeding said liquid spring pressure.

15. In a liquid spring including a cylinder having a bore formed therein and a piston slidable in said bore cooperating to define a chamber containing liquid means, the spring relying upon compressibility of the liquid means for its resilience, an improvement comprising: a groove formed in the periphery of said piston between said piston and said bore, seal means formed of expandable material seated in said groove, a sleeve of high strength plastic overlying said seal means, said liquid means including a liquid which is effective upon said expandable material to cause growth of said material and cause said seal means to increase in volume and exert a predetermined pressure against said sleeve in excess of the pressure exerted upon said liquid means by compression during normal operation of the liquid spring, said sleeve having a predetermined thickness less than that which will permit cold extrusion of said plastic at said predetermined pressure.

16. A method of establishing and maintaining a sealing pressure between cooperating members in a liquid spring wherein the sealing pressure exceeds the normal pressure developed in the spring and the sealing medium is an elastomeric element, comprising the steps of: soaking the elastomeric material for a predetermined period of time in a liquid which is effective to cause chemical growth or expansion of the element for a predetermined period of time, removing the element and permitting the liquid to substantially evaporate from the element, seating the element in sealing relationship in the spring, and treating the element with said liquid while in the spring to cause chemical growth or expansion of the element until it exerts a predetermined sealing pressure between the members.

17. The method of claim 16 further characterized by and including the step of allowing the assembled spring to sit for in excess of one day before using said spring in normal operation.

References Cited by the Examiner

UNITED STATES PATENTS

| | | | |
|---|---|---|---|
| 1,483,812 | 2/42 | Isakson | 277—165 X |
| 2,285,870 | 6/42 | Parker | 277—188 |
| 2,716,451 | 8/55 | Taylor | 267—64 |
| 2,823,058 | 2/58 | Ecker et al. | 277—165 |
| 2,873,963 | 2/59 | Taylor | 267—64 |
| 2,909,368 | 10/59 | Taylor | 267—64 |
| 2,909,398 | 10/59 | Taylor. | |
| 2,949,315 | 8/60 | Taylor | 267—64 X |
| 2,960,332 | 11/60 | Lindow et al. | 267—64 |
| 2,973,978 | 3/61 | Oppenheim | 277—188 |
| 3,012,770 | 12/61 | Kendall | 267—64 |
| 3,094,337 | 6/63 | Pippert et al. | 277—188 |

FOREIGN PATENTS 1,211,117  10/59  France.

ARTHUR L. LA POINT, *Primary Examiner.*
ROBERT C. RIORDIN, *Examiner.*

UNITED STATES PATENT OFFICE
CERTIFICATE OF CORRECTION

Patent No. 3,186,702

June 1, 1965

Paul Hollis Taylor

It is hereby certified that error appears in the above numbered patent requiring correction and that the said Letters Patent should read as corrected below.

Column 4, line 4, for "prevent" read -- prevention --; column 9, line 27, after "assembly" insert -- and exposure to the growth agent 34A or 34B of FIGURE --; column 12, line 40, for "Potent" read -- Patent --; column 14, line 33, beginning with "The gauge 87" strike out all to and including "ram 85 and base 75B" in line 37, same column 14, and insert instead -- being taken on this piston 72 which proved, considering the volume there, in this particular instance, that the seal had generated internal pressure exceeding 30,000 p.s.i. The gauge 87, piston 72, and containment fixture 70 being confined between a ram 85 and base 75B. --; column 15, line 55, for "intensify" read -- intensifying --.

Signed and sealed this 7th day of December 1965.

(SEAL)
Attest:

ERNEST W. SWIDER
Attesting Officer

EDWARD J. BRENNER
Commissioner of Patents